E. C. HOUGHTON.
FILTER.

No. 175,608. Patented April 4, 1876.

Witnesses.
Geo Gray
F. G. Hale

Edward C. Houghton
by his attorney
J. P. Hale

UNITED STATES PATENT OFFICE.

EDWARD C. HOUGHTON, OF CAMBRIDGEPORT, ASSIGNOR TO CALEB C. WALWORTH, OF BOSTON, MASSACHUSETTS.

IMPROVEMENT IN FILTERS.

Specification forming part of Letters Patent No. 175,608, dated April 4, 1876; application filed December 8, 1875.

*To all whom it may concern:*

Be it known that I, EDWARD C. HOUGHTON, of Cambridgeport, in the county of Middlesex and State of Massachusetts, have invented certain new and useful Improvements in Filters; and I do hereby declare that the following is a full, clear, and exact description thereof, which will enable others skilled in the art to which it pertains to make and use the same, reference being had to the accompanying drawing, and to the letters of reference marked thereon, which form a part of this specification.

Figure 1:
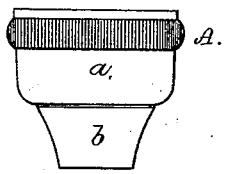
Figure 2:
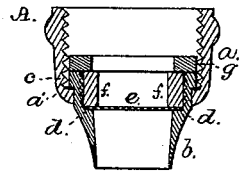
Figure 3:
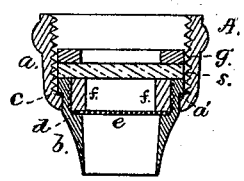

In said drawing, Figure 1 is a side elevation, and Figs. 2 and 3 vertical sections of a filter constructed in accordance with my invention.

The object of my invention is to produce a simple, cheap, and effective device for filtering water, &c.; and consists in the peculiar construction, combination, and arrangement of the parts, as hereinafter described and claimed.

In the drawing, A denotes the body of the filter, which is composed of two parts, $a$ and $b$. The upper part $a$ is of a hollow cylindrical or frusto conic shape, and provided at its lower end with an internal annular shoulder or flange, $a'$. The part $b$, which is the eduction end of the filter, is formed partly cylindrical and partly frusto conic. The upper part of the cylindrical portion is made with an external annular shoulder, $c$, which rests upon the flange $a'$. Within the part $b$ is an annular shoulder, $d$, upon which is placed a wire-gauze or strainer $e$. $f$ is a metallic ring, which rests upon the strainer near its periphery or outer edge, such ring having an external diameter corresponding with the internal diameter of the upper portion of the part $b$, and extending up flush with the upper surface thereof. This ring performs the double function of maintaining the strainer in place, and giving to the stream of water a round, smooth flow, and for this purpose has its internal diameter corresponding with or nearly with that of the eduction end or mouth of she filter. $g$ is an annular packing, composed of leather, or other suitable or elastic or semi-elastic material, such packing corresponding in diameter with the internal diameter of the part $a$, and having a width sufficient to cover the joint between the ring $f$ and the removable part $b$ of the filter. This packing, so constructed and arranged, performs the function of packing both the latter joint and the joint between the parts $a$ and $b$, the same being as shown in Fig. 2, which shows my invention in its simplest form.

In Fig. 3 I have shown a layer of sponge, $s$, arranged underneath the leather washer, which may be used if desirable.

The upper part of the filter has a female screw cut in its internal surface, such enabling the device to be readily affixed to ordinary basin or other cocks, provided with a screw cut upon their nozzles, and when applied is to be screwed up until the end of the cock-nozzle shall impinge upon the washer with the required force to tightly pack the joints of the filter.

The object of making the body of the filter in two parts, as described, is to enable the strainer to be readily removed without destroying the packing, as would result were the two parts formed integral.

Under my construction, all that is requiste to remove the packing, however closely compacted it may have become, is simply to press upon the lower end of the part $b$, which will force the same inward, and thereby raise the packing into the chamber of the part $a$, when it can be readily removed.

Having described my invention, what I claim is—

1. As an improved article of manufacture, the improved filter, consisting of the body formed in two parts, $a$ $b$, as described, the strainer $e$, ring $f$, and packing-annulus $g$, constructed, combined, and arranged in manner as set forth and shown.

2. In a filter, the combination of the body A formed in two parts, as stated, the strainer $e$, annulus $f$, the layer of sponge $s$, and elastic packing-ring. $g$, all constructed, combined, and arranged in manner as shown and described.

In testimony that I claim the foregoing as my own invention I affix my signature in presence of two witnesses.

EDWARD C. HOUGHTON.

Witnesses:
F. P. HALE,
F. C. HALE.